UNITED STATES PATENT OFFICE.

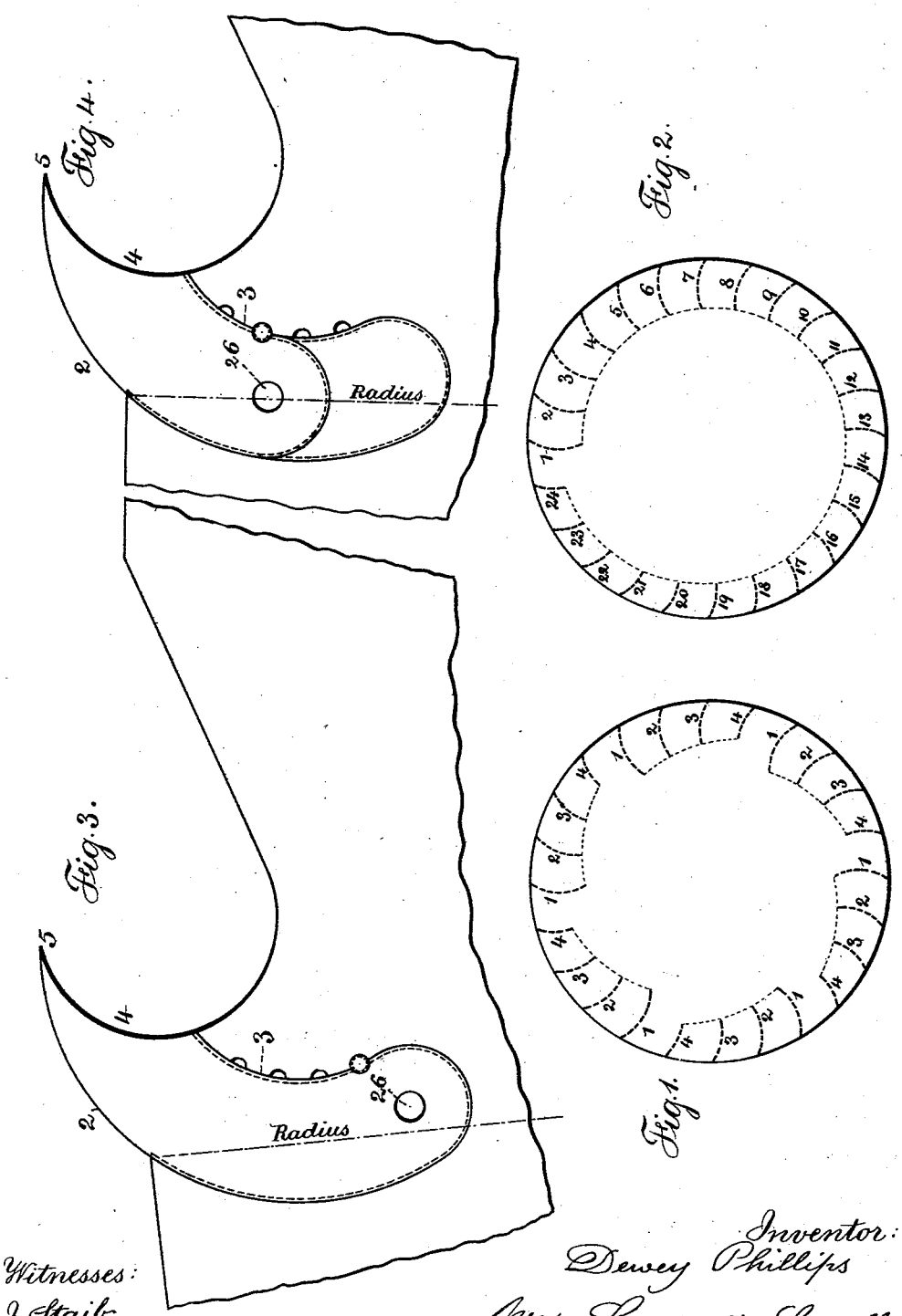

DEWEY PHILLIPS, OF ARLINGTON, VERMONT.

SAW.

SPECIFICATION forming part of Letters Patent No. 571,955, dated November 24, 1896.

Application filed May 31, 1892. Serial No. 435,070. (No model.)

*To all whom it may concern:*

Be it known that I, DEWEY PHILLIPS, a citizen of the United States, residing at Arlington, in the county of Bennington and State of Vermont, have invented an Improvement in Saws, of which the following is a specification.

Movable teeth have been introduced into slots or mortises cut in the saw-plate, and such teeth and slots have been in some instances upon the arcs of circles, so that the teeth can be set out progressively as they are filed away, and rivets have been employed for holding such teeth in position.

The first part of my invention relates to the peculiar movable saw-tooth in which the convex edges of the saw-teeth extend to the cutting-points, or nearly so, and there are convex throats to the teeth themselves and also throats in the edges of the saw-plate forming continuations of the throats of the teeth; and the second feature of my invention relates to the saw adapted to receive the movable teeth, the saw itself having mortises cut in the edge at successively deeper distances, so that as the teeth are worn away they are set along into other mortises, so as to maintain the saw of the original diameter, and new teeth are introduced progressively, the smallest tooth being removed at one end and a new and largest tooth being inserted at the other end of the range of slots in the saw.

In the drawings, Figure 1 is a diagram representing the manner in which the successive slots or mortises are laid out for six ranges of teeth. Fig. 2 is a similar view illustrative of the manner in which the saw is laid out for one range of teeth. Fig. 3 is an elevation of one tooth and the edge of the saw into which it is inserted, and Fig. 4 represents the saw-tooth after it has been partially worn away and set out for the point to be at the original distance from the axis of rotation.

Each saw-tooth is made as an arc of a circle upon its back or convex edge 2 and as an arc of a circle upon its inner or concave edge 3, these two arcs being parallel, and the throat 4 of the tooth is concave and undercut, so that the cutting-point 5 is formed by the junction of the two arcs of circles, or nearly so. Hence as the tooth is filed from time to time the shape of the point will not be varied or the angle of the cutting edge changed materially, and I provide, as hereinafter set forth, for maintaining a uniform diameter for the cutting edge of the saw by setting out the teeth to the original radius of the saw after they may have been filed away.

The convex and concave edges of the teeth and of the saw-plate at the slot are to be V-shaped, so that the teeth cannot become displaced laterally, and in the edges of the teeth and the edges of the saw-plate at the concave sides of the teeth countersunk holes are provided at regular distances apart for the reception of rivets, which prevent the teeth being thrown out by centrifugal force, and these rivets may be of comparatively soft metal, so as to be easily removed for setting out the teeth or changing such teeth from one place to another.

In Fig. 2 I have represented the bases of the slots for the teeth at regular gradations from the axis of rotation, that is to say, the slot 1 is of a depth adapted to the longest tooth and the slot 24 is adapted to the reception of the shortest tooth, and the intermediate slots are at regularly-increasing distances from the axis of the saw, and the teeth that are introduced into these slots originally are of decreasing length, the tooth introduced into the slot 1 being the longest and the tooth introduced into the slot 24 being the shortest, and these teeth being of regularly-decreasing length the points of the teeth are equidistant from the axis of rotation, and with this arrangement of teeth it will be understood that the teeth are to be filed or sharpened in the ordinary manner, and when the saw has been decreased in diameter by the sharpening operation to the predetermined extent the tooth in the slot 24 is to be removed and the tooth in the slot 23 substituted, and this operation is to be continued all the way around the saw until the tooth from the slot 1 is introduced into the slot 2 and a new tooth of the original or proper length is introduced into the slot 1. By this means the teeth can be set out progressively and removed successively as worn out, and the sharpening operation should not be carried on more than the difference in the measurement between one tooth and the next; otherwise two teeth may require to be removed from the saw and two new ones introduced.

If the teeth are sharpened from time to time, such teeth will be shortened and the diameter of the saw reduced, and this may be done, if desired, as the short teeth are the strongest.

The same mode of operation is pursued in the saw represented in Fig. 1, in which the circular-saw plate is divided up into six sections, each one containing four teeth, the teeth in the slots marked 4 being the shortest and in the slots marked 1 being the longest, and these teeth are set forward successively, so that when worn down the teeth in the slots 4 are entirely removed and the teeth from the slots 3 substituted and new teeth introduced into the slots 1.

It will be observed that the openings for the reception of the rivets are to be provided at uniform distances from the bases of the slots, and in cases where the slots are of uniform depth the teeth may be set out successively without being changed from one slot to the other, provided the teeth have semicircular notches to conform to the semicircular rivet-notch in the saw-plate, and, if desired, segmental or crescent-shaped filling-pieces may be introduced into the bottoms of the slots for the teeth to rest upon after being set out.

These improvements, although specially intended for circular saws, may be employed upon straight saws.

With long teeth two rivets may be employed, and with short teeth single rivets only are necessary. By providing holes 26 in the teeth at or near the lower ends a pin may be inserted for convenience in withdrawing or driving out the teeth successively.

The number of sections into which the saw is divided may be varied, and the number of teeth in each section may be from two up to any desired number.

The throat 4 in each tooth is a continuation of the curve of the throat in the saw-blade. Hence there is no risk of the chips wedging in the throat, as there is no angle or change of curvature and the chips are delivered freely, and in consequence of the concave inner surface of each tooth intersecting the curved surface of the throat nearly at right angles there is no risk of the metal springing or of the chips wedging at this point.

In consequence of the longitudinal curve of the saw-tooth being subtended by a radius and substantially perpendicular to the intersecting tangent at the edge of the saw the centrifugal action tending to project the tooth tangentially and the centripetal radial action are divided, so that there is but little tendency for the tooth to fly out, and the same is held reliably by a small pin.

I claim as my invention—

1. In a saw having detachable teeth set into and fitting slots formed entirely in the body or main plate of the saw, the removable adjustable teeth each having a convex outer edge extending from the base to the cutting-point or nearly so and a curved inner edge parallel to the convex edge and a concave throat to the point of the tooth, the saw having slots with curved parallel edges corresponding to the teeth and concave recesses in the edges forming continuations of the throats in the teeth, the longitudinal curve of each saw-tooth being subtended by a radius and substantially perpendicular to the intersecting tangent so that the teeth are not liable to be thrown out when in use, and pins for holding the teeth in place substantially as specified.

2. In a saw having detachable teeth set into and fitting slots formed entirely in the body or main plate of the saw, the removable adjustable teeth each having a convex outer edge extending from the base to the cutting-point or nearly so and a curved inner edge parallel to the convex edge and a concave throat to the point of the tooth, the saw having slots with curved parallel edges corresponding to the teeth and concave recesses in the edges forming continuations of the throats in the teeth, the longitudinal curve of each saw-tooth being subtended by a radius and substantially perpendicular to the intersecting tangent so that the teeth are not liable to be thrown out when in use, and notches at uniform distances apart and pins whereby the teeth can be set out progressively, substantially as specified.

3. The combination with the removable saw-teeth, of a saw-plate having notches for the reception of the teeth, such notches varying in depth in regular gradations for the reception of teeth varying in length in similar regular gradations, so that the teeth may be set out from time to time as worn away, by changing the teeth from the deeper into the shallower notches, substantially as set forth.

Signed by me this 9th day of May, 1892.

DEWEY PHILLIPS.

Witnesses:
B. W. SAFFORD,
P. E. SAFFORD.